United States Patent
Furuichi

(10) Patent No.: US 7,023,574 B2
(45) Date of Patent: Apr. 4, 2006

(54) MULTIFUNCTIONAL PRINTER

(75) Inventor: Akira Furuichi, Tochigiken (JP)

(73) Assignee: Panasonic Communications Co., Ltd., Tokyo (JP)

( * ) Notice: Subject to any disclaimer, the term of this patent is extended or adjusted under 35 U.S.C. 154(b) by 904 days.

(21) Appl. No.: 10/118,953

(22) Filed: Apr. 10, 2002

(65) Prior Publication Data

US 2002/0149790 A1    Oct. 17, 2002

(30) Foreign Application Priority Data

Apr. 11, 2001 (JP) ............................ P2001-112748

(51) Int. Cl.
*B41F 1/00* (2006.01)

(52) U.S. Cl. ................. 358/1.15; 358/1.14; 358/1.16; 399/19; 399/23; 399/83; 399/85

(58) Field of Classification Search ............... 358/1.14, 358/1.15, 1.16; 399/19, 82
See application file for complete search history.

(56) References Cited

U.S. PATENT DOCUMENTS

| | | | | |
|---|---|---|---|---|
| 6,014,528 | A | * | 1/2000 | Natsume et al. ............... 399/19 |
| 6,249,658 | B1 | * | 6/2001 | Inui et al. ...................... 399/82 |
| 6,400,464 | B1 | * | 6/2002 | Suehiro ...................... 358/1.16 |
| 6,914,690 | B1 | * | 7/2005 | Uchida ........................ 358/1.14 |

* cited by examiner

*Primary Examiner*—Mark Wallerson
*Assistant Examiner*—Satwant Singh
(74) *Attorney, Agent, or Firm*—Greenblum & Bernstein, P.L.C.

(57) ABSTRACT

A multifunctional printer retains image data in an image memory when paper runs out during a copying operation, until another operation is requested or a predetermined time period expires. Also, the multifunctional printer retains information of the document that has not been recorded in a RAM when erasing the image data. Then, the information is displayed on an operation panel when the document needs to be re-scanned in order to enable the user to re-scan the document.

15 Claims, 11 Drawing Sheets

Fig. 2

Copy managing information (a)
Designated parameters

| List | Explanation |
|---|---|
| #of copies | #of copies per one sheet of doc. |
| Operation mode (supplement) | Designation of doc. grouping/division |
| Paper feeder | Designation of tray |
| Doc. size | Scanning range for doc. |
| X-direction zoom value | Zoom rate for main scanning direction of doc. |
| Y-direction zoom value | Zoom rate for sub scanning direction of doc. |
| Width for doc border erasing | Width for doc. border erasing function |
| Width for doc center erasing | Width for doc. center erasing function |
| Margin adjustment | Adjusting margin of doc. by shifting scanned image |
| Finishing mode | Finishing method e.g. staple, shifting, etc. |
| Need for punch holes | Designating punch holes for doc. |

Supplement
- 1sided→1sided
- 1sided→2sided
- 2sided→1sided
- 2sided→2sided
- 2image division
- 4image division
- 1sided 2image combine→1sided
- 1sided 4image combine→1sided
- 1sided 8image combine→1sided
- 1sided 2image combine→2sided
- 1sided 4image combine→2sided
- 1sided 8image combine→2sided (b)
Operation managing information

| List | Explanation |
|---|---|
| Operation pattern | Managing back/front sides of doc.+copies |
| ADF fed doc.info | #of doc.pages fed by ADF |
| Scanned doc.info | #of doc.pages scanned |
| Printed doc.info | #of print out pages printed (not ejected) |
| Ejected doc.info | #of print out pages ejected from machine |
| Re-scanning #of pages | #of doc.pages for user to re-do |
| Printer obtaining status | Presence/absence of right of printer use |

MULTIFUNCTIONAL PRINTER

BACKGROUND OF THE INVENTION

1. Field of the Invention

This invention relates to a multifunctional printer that retains an unrecorded scanned image for a predetermined time period when recording paper runs out during a copying operation.

2. Description of Related Art

A conventional multifunctional printer scans a document, stores the scanned image in a memory, and copies the image on recording paper. Even if recording paper runs out during the copying process, the scanned image is retrieved from the memory and recorded when more recording paper is loaded, without re-scanning the document. Thus, when recording paper runs out and even if a user is away from the multifunctional printer, the scanned image is still stored in the memory. Therefore, it is possible to retain the image until it can be printed, even if it takes a long time to load the recording paper.

However, the conventional technology had the following problems.

In particular, a multifunctional printer not only operates as a copier but as a printer, therefore, there are situations in which a separate second operation is requested while a first operation is being performed. Thus, when paper runs out during a copying operation, and the image for the copying operation is kept stored in a memory, the memory cannot be released to be utilized for the printing operation. In this case, plurality of operations cannot be performed even though a multifunctional printer is used, thus resulting in an adverse effect of lowering the efficiency of processing the operations.

Also, when paper runs out during the copying process, the printer can erase the image in the memory in order to release the memory to other operations such as a printing operation and to enable the other operation to proceed. However, in such a case, user has to re-scan the entire document even though the copying process is partly done, merely because the paper has run out, thus requiring duplication of the procedures of re-scanning the document and overly increasing and complicating the user's workload.

SUMMARY OF THE INVENTION

This invention addresses the above-described problem. The object of the present invention is to provide a multifunctional printer that can reduce the workload of re-scanning a document and improve the efficiency of processing a plurality of operations, when paper runs out during a copying operation and another operation is requested.

In a situation in which paper has run out during the copying operation and another operation is requested, or a predetermined time period expires, the multifunctional printer according to the present invention erases image data in the memory and releases the memory to the other operation. However, the multifunctional printer also retains document managing information necessary for re-scanning and further enabling a user to re-scan the necessary document using the previously retained document managing information once recording paper is loaded.

According to the multifunctional printer of the present invention, in case paper runs out during the copying operation and another operation is requested, the printer erases image data in the memory to release the memory to the other process. Accordingly, a plurality of operations can be processed effectively using the limited memory available in the multifunctional printer. Upon erasing the image data, managing information of a document that needs to be re-scanned is retained so that the user is enabled to re-scan the necessary document using the managing information, once recording paper is loaded. Accordingly, the user has to re-scan only the minimally required document, thus reducing the workload of re-scanning the entire document and improving efficiency of processing a plurality of operations.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIGS. 2(*a*) and 2(*b*) illustrates an example of copy managing information stored in a RAM of the multifunctional printer of the first embodiment of the present invention;

DETAILED DESCRIPTION OF PREFERRED EMBODIMENTS

The embodiment of multifunctional printer according to the present invention is explained in the following, in reference to the above-described drawings.

First Embodiment

Figure 1:
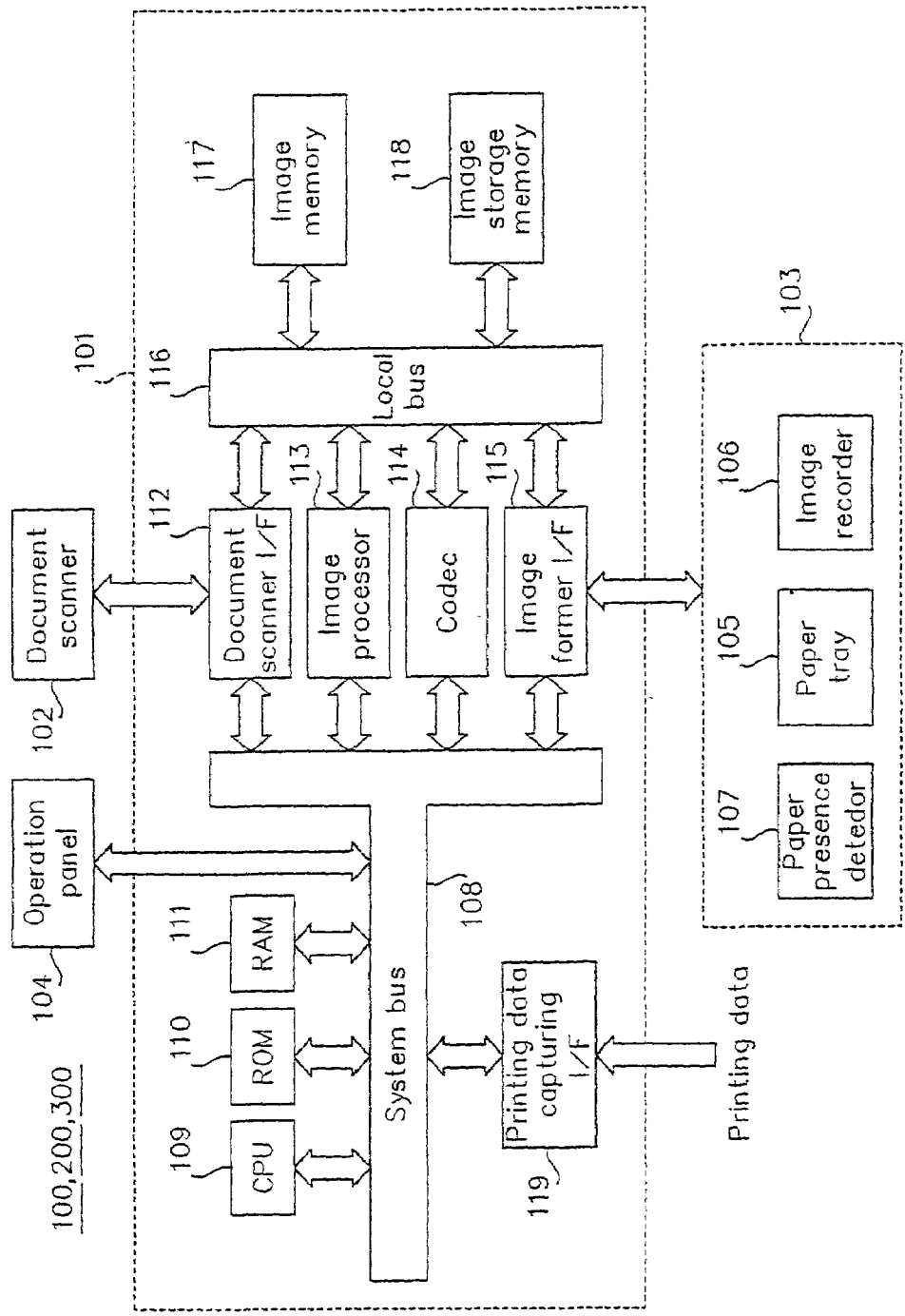
FIG. 1 is a functional block diagram of a multifunctional printer according to a first embodiment of the present invention.

FIG. 1 is a functional block diagram illustrating multifunctional printer 100 according to the first embodiment of the present invention. Multifunctional printer 100 shown in FIG. 1 includes central processing apparatus 101 that controls the entire multifunctional printer 100, document scanner 102 that scans documents, image former 103 that forms images on recording paper, and operation panel 104 that receives instructions from a user and displays information for the user.

The above-described image former 103 includes paper tray 105 that stores recording paper, image recorder 106 that records image on recording paper retrieved from paper tray 105, and paper presence detector 107 that detects the presence/absence of recording paper.

In the above central processing apparatus 101, ROM 110 and RAM 111 are connected to CPU 109 via system bus 108. ROM 110 is used as a storage area to store operation programs of CPU 109, and RAM 111 is used as a storage area to provide a work area or the like for CPU 109.

Also, document scanner interface (I/F) 112, image processor 113, codec 114, and image former interface (I/F) 115 are connected to system bus 108. Document scanner interface (I/F) 112 connects document scanner 102 and system bus 108 and edits scanned image data. Image processor 113 is an image processing circuit that enlarges/reduces image data or rotates image data by a given degree. Codec 114 performs encoding/decoding process for image data. Image former interface (I/F) 115 transmits the image data of recording image from central processing apparatus 101 to image former 103.

Further, image memory 117 and image storage memory 118 are connected to document scanner interface (I/F) 112, image processor 113, codec 114, and image former interface (I/F) 115 via local bus 116. Image memory 117 stores image data scanned by document scanner 102, and image storage memory 118 stores image data after the encoding process by codec 114. These devices are connected via local bus 116 in order to achieve high-speed data transmissions between these devices.

Also, printing data capturing interface (I/F) 119 is connected to system bus 108. Printing data capturing interface (I/F) 119 captures printing data created by a data terminal apparatus such as a personal computer (PC).

When performing a document copying operation using multifunctional printer 100 of the above configuration, when a document is scanned by document scanner 102, managing information to copy the document (copy managing information) is stored in a predetermined area of RAM 111.

FIG. 2 illustrates an example of the copy managing information stored in RAM 111. As shown in FIG. 2, the copy managing information is configured with parameters designated by a user when copying the document (designated parameters), and information to monitor whether copying operation of the document is completed (operation managing information). FIG. 2(a) shows an example of the designated parameters, and FIG. 2(b) shows an example of the operation managing information.

As shown in FIG. 2(a), designated parameters include number of copies, operation mode, paper feeder, document size, X/Y-direction zoom value, width for document border erasing, width for document center erasing, margin adjustment, finishing mode, and need for punch holes, etc. As shown in the supplement explanation, document grouping and division in the operation mode of FIG. 2(a) includes operation mode for copying on one/two sides and operation mode for dividing/combining images.

As shown in FIG. 2(b), the operation managing information include operation pattern, ADF fed document information, scanned document information, printed document information, ejected document information, re-scanning page number, and printer obtaining status, etc. Multifunctional printer 100 of the present invention is characterized by including the printed document information, ejected document information, and re-scanning page number in the operation managing information.

The printed document information displays number of pages of recording paper that has recorded the image data but has not been ejected, while the ejected document information displays number of pages of recording paper that has been ejected. The re-scanning page number information shows document page number that needs to be re-scanned by a user, after the document copying operation has been interrupted.

Figure 3:
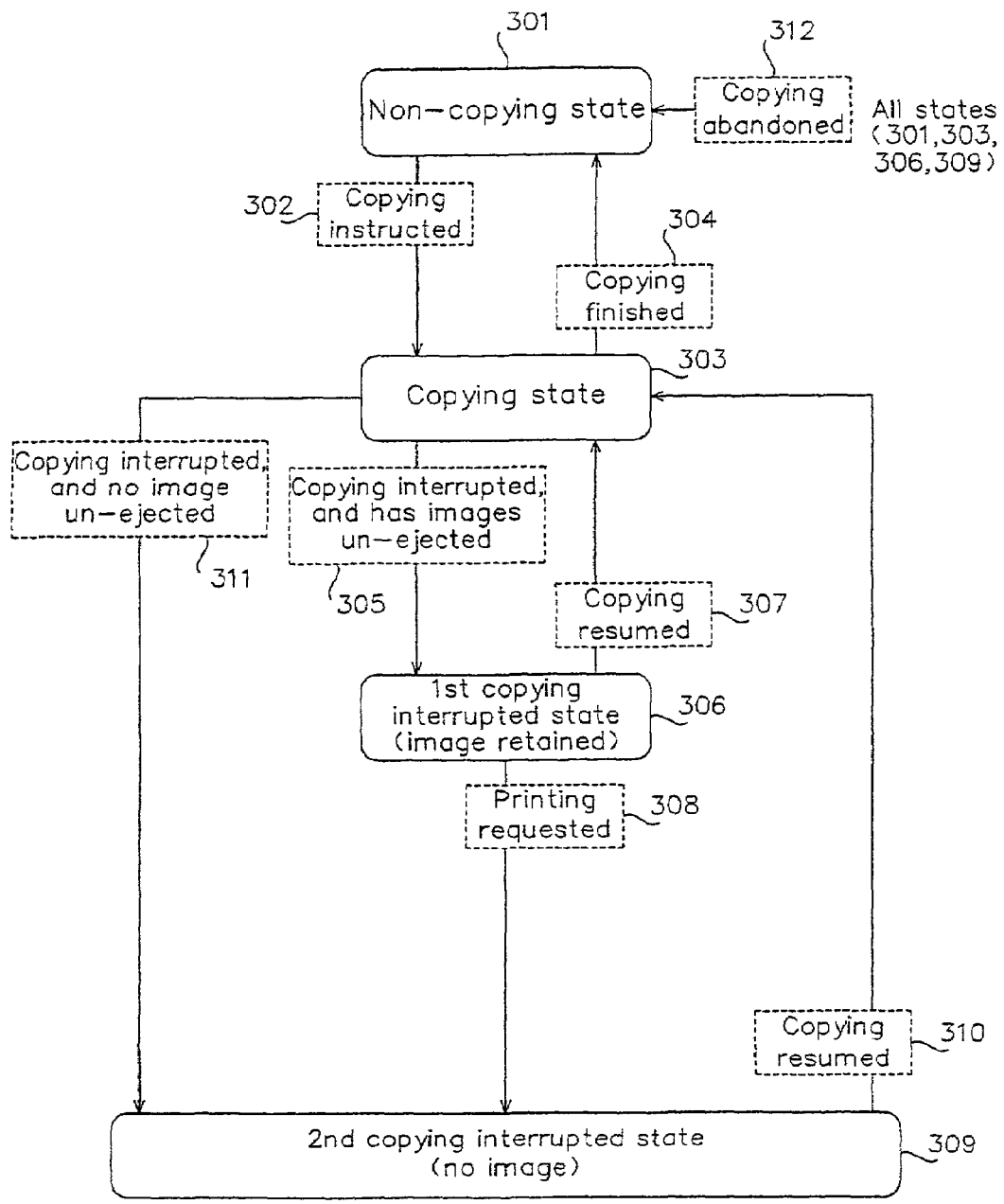
FIG. 3 is a transitional diagram illustrating the control of the multifunctional printer according to the first embodiment of the present invention.

The operations of multifunctional printer 100 with the above configuration are illustrated in detail as follows. FIG. 3 is a transitional diagram illustrating the control of multifunctional printer 100 according to the first embodiment. In FIG. 3, bolded(solid-line) sections illustrate states of multifunctional printer 100, and sections with dotted lines are conditions for one state of multifunctional printer 100 to move to another state.

As shown in FIG. 3, the control of multifunctional printer 100 moves from a state in which copying operation is stopped, including a waiting state (hereafter referred to as "non-copying state") (301) to a state in which copying operation is started (hereafter referred to as "copying state") (303), when there is an instruction for a copying operation by a user (302). The control also moves from copying state (303) to non-copying state (301), when the instructed copying operation is finished (304).

Also, when the instructed copying operation is interrupted at copying state (303), and there is image data that has not been ejected (305), the control moves to a state of interrupting the copying operation while retaining the image data (hereafter referred to as "the first copying interrupted state") (306). A specific example of when control would move to the first copying interrupted state (306) is when paper has run out at multifunctional printer 100. If there is another instruction for the copying operation (307) from the first copying interrupted state, the control moves back to copying state (303).

Further, at the first copying interrupted state (306), when a printing operation is requested by a connected data terminal apparatus such as a personal computer (hereafter referred to as PC) as a separate operation (308), the control moves to a state erasing the retained image data and maintaining the interrupted copying operation (hereafter referred to as "the second copying interrupted state") (309). When there is another instruction of the copying operation from the second copying interrupted state (310), the control moves to copying state (303).

If the copying operation instructed at copying state (303) is interrupted, and there is no image data un-ejected (311), the control moves to the second copying interrupted state (309). A specific example of moving to the second copying interrupted state (309) directly from the copying state (303) is when the document scanning is not properly performed. Also, from each of the states (301, 303, 306, and 309), when a user instructs abandoning the copying operation (312), the control moves to non-copying state (301).

Figure 4:
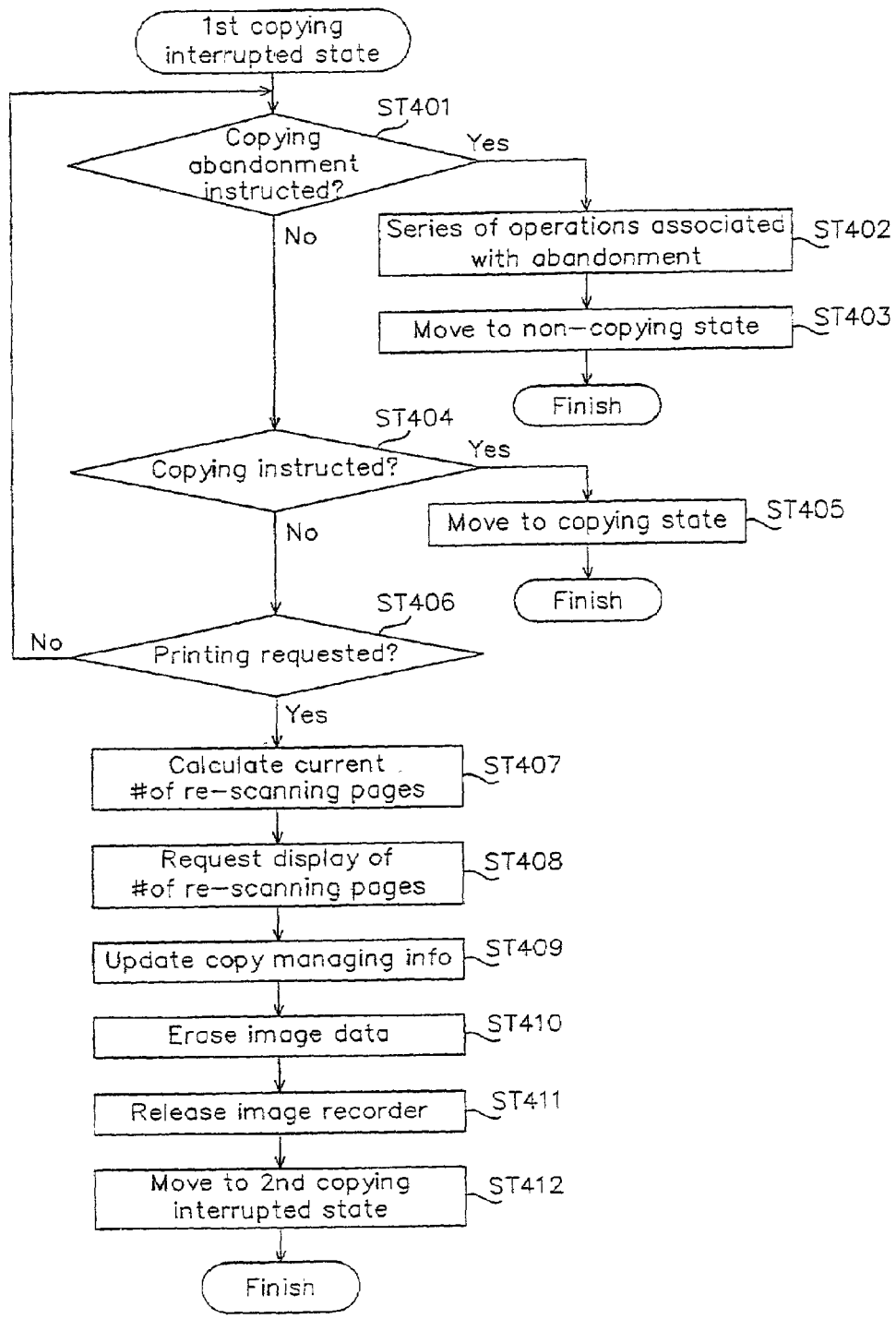
FIG. 4 is a flowchart illustrating an operation when a copying operation is interrupted at the multifunctional printer according to the first embodiment of the present invention.

FIG. 4 is a flowchart illustrating an operation when multifunctional printer 100 of the first embodiment interrupts the copying operation (the first copying interrupted state). The first copying interrupted state (303) of the initial state of FIG. 4 occurs when a document has been scanned, but recording paper ran out during the copying, thus leaving some of the image data unrecorded on recording paper.

In the first copying interrupted state (303), multifunctional printer 100 monitors whether there is an instruction to abandon the copying operation (312) (ST 401). When there is an instruction to abandon the copying operation, a series of operations associated with the copying operation abandonment is performed (ST 402), and the control moves to non-copying state (301) (ST 403).

In this embodiment, a series of operations associated with the copying operation abandonment means 1) erasing the copy managing information stored in RAM 111 at document scanning; 2) erasing the retained image data; 3) releasing image recorder 106; and 4): retrieving the request to display the later-described information regarding re-scanning page number, if previously requested.

If there is no instruction to abandon the copying operation, whether there is another instruction for the copying operation by the user (307) is checked (ST 404). If there is another instruction (307), the control moves to copying state (303) (ST 405).

To receive and carry out an instruction for another copying operation at ST 404, recording paper needs to be loaded prior to an indication. When recording paper is not loaded, operation panel 104 continues to display that the apparatus is out of paper and cannot receive an instruction for a copying operation from the user.

If there is no instruction for another copying operation (307), whether a printing operation is requested by a user as a separate operation (308) is checked (ST 406). If there is no request for a printing operation (308), the control returns to ST 401, and monitors again whether there is an instruction to abandon the copying operation (312).

If there is a request for a printing operation (308), re-scanning page number is calculated for when the currently retained image data is erased (ST 407). The control requests operation panel 104 to display the re-scanning page number (ST 408), writes the calculated re-scanning page number in the re-scanning page number information of the copy managing information, and updates the copy managing information (ST 409).

Upon updating the copy managing information, image data retained in image memory 117 is erased, and image memory 117 is released to the printing operation (ST 410). Further, image recorder 106 is released to the printing operation (ST 411), and the control moves to the second copying interrupted state (309) (ST 412).

For example, when copying 5-page document and if, after all 5 pages have been scanned, paper runs out during the copying operation of the $4^{th}$ page, the $4^{th}$ and $5^{th}$ pages need to be re-scanned. Therefore, the re-scanning page number is calculated as pages 4 and 5 and written as the re-scanning page number information of the copy managing information at ST 409.

Figure 5:
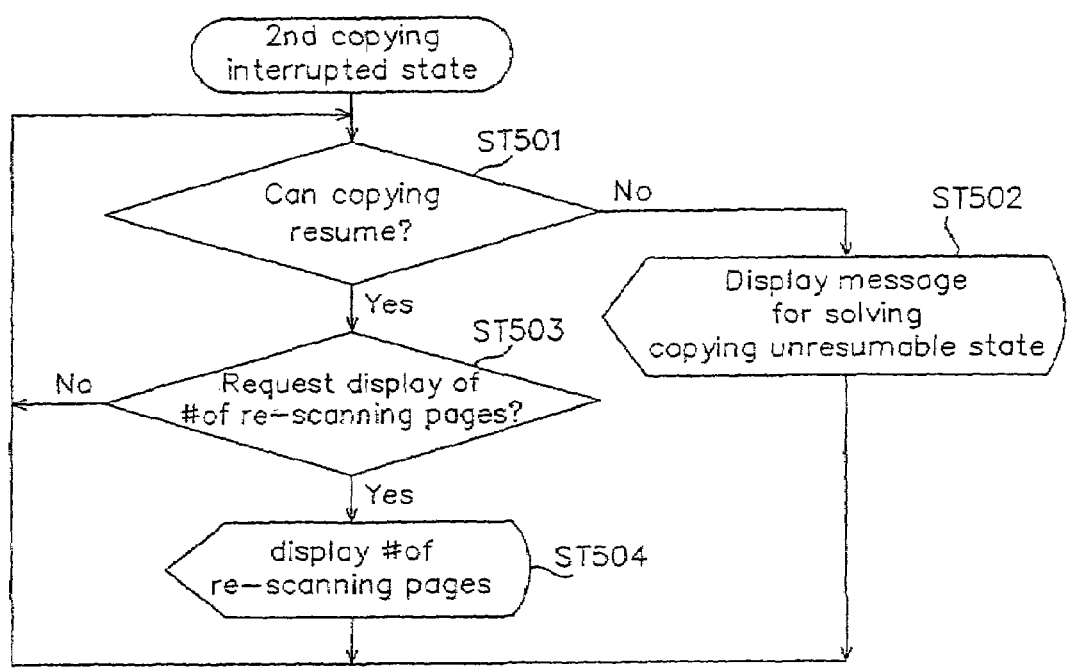
FIG. 5 is a flowchart illustrating a message selecting operation of an operation panel when a copying operation is interrupted at the multifunctional printer according to the first embodiment of the present invention.

FIG. 5 is a flowchart illustrating a message selecting operation of operation panel 104 when multifunctional printer 100 is in copying interrupted state (the second interrupted state) shown in FIG. 4.

At the second copying interrupted state (309), multifunctional printer 100 determines whether the copying operation can be resumed (ST 501), in order to select a message to be displayed on operation panel 104.

When it is determined that the copying operation cannot be resumed, a message is displayed on operation panel 104 to resolve the current state in which copying operation cannot be resumed (ST 502). For example, if it is determined that the copying operation cannot be resumed because recording paper has not been loaded, a message such as "please load recording paper in the paper tray" is displayed.

On the other hand, if it is determined that the copying operation can be resumed, whether a display of the re-scanning page number is requested is checked (ST 503). The request for displaying the re-scanning page number is determined by whether the process of ST 408 is performed as shown in FIG. 4. The page number is part of the stored operation managing information.

If there is no request for displaying the re-scanning page number, the control returns to ST 501 to re-check whether the copying operation can be resumed. If there is such a request, the requested re-scanning page number is displayed on operation panel 104 (ST 504). To explain using the above example, operation panel 104 displays pages 4 and 5 among the previously scanned document, to show pages 4 and 5 need to be re-scanned.

According to the multifunctional printer 100 of the first embodiment, in case recording paper runs out during a copying operation is, and a printing operation being requested as a separate operation, image data in image memory 117 is erased in order to release image memory 117 to the printing operation, and the re-scanning page number information, that shows the document information necessary for re-scanning, is retained. When recording paper is loaded, the user of multifunctional printer 100 is enabled to scan the document necessary for re-scanning, according to the re-scanning page number information. Therefore, when another operation is requested, it is possible to use the memory for the next operational request in a state in which paper has run out during the copying operation. At the same time, the user only needs to re-scan the document from the point where the copying process was interrupted, and securely scans all of the document that needs to be copied. Accordingly, even in a case of paper running out during a copying operation and another operation is requested, it is possible to reduce the workload of the user to re-scan the entire document, and efficiently process a plurality of operations with a limited memory resource.

Also, according to multifunctional printer 100, it is possible to retain the image data in image memory 117 until a printing operation is requested, even if recording paper runs out during a copying operation. Therefore, when paper is loaded before a printing operation is requested, it is possible to resume the copying operation based on the image data retained in image memory 117. Accordingly, in case of paper running out during a copying operation and a printing operation being requested, it is possible to reduce the user's workload to re-scan the document, and efficiently process a plurality of operations with a limited memory resource.

In this embodiment, a situation in which a printing operation is requested as a separate operation is illustrated. However, the invention is not limited to the above embodiment. For example, a facsimile reception operation can be requested as a separate operation. Thus, it is possible to achieve the same effect as the present embodiment, even if an other operation is requested as a separate operation.

Second Embodiment

Multifunctional printer 200 according to the second embodiment of the present invention includes the same configuration as the multifunctional printer 100 according to the first embodiment, however, a part of the operational control is different. Hereafter, the operation of the multifunctional printer 200 according to the second embodiment is illustrated.

Figure 6:
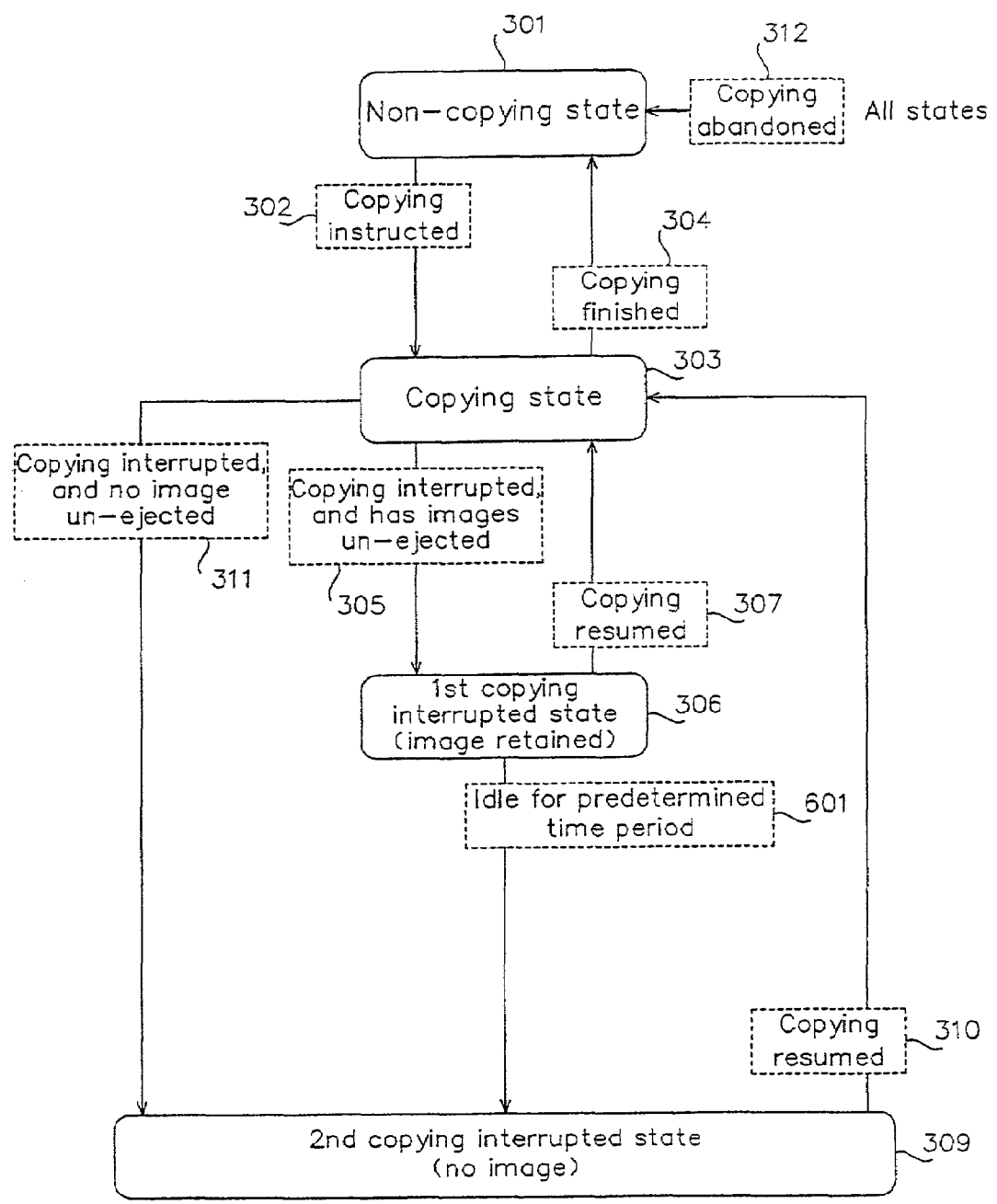
FIG. 6 is a transitional diagram illustrating the control of the multifunctional printer according to a second embodiment of the present invention.

FIG. 6 is a transitional diagram illustrating control of multifunctional printer 200 according to a second embodiment. In FIG. 6, parts having the same numerical characters as in FIG. 3 represent the same states and transitions as in FIG. 3.

The state transition of multifunctional printer 200 of the second embodiment is different from multifunctional printer 100 of the first embodiment only in the transitional conditions of moving from the first copying interrupted state (306) to the second copying interrupted state (309).

Multifunctional printer 100 of the first embodiment moves from the first copying interrupted state (306) to the second copying interrupted state (309) when a printing operation is requested, whereas multifunctional printer 200 of the second embodiment moves from the first copying interrupted state (306) to the second copying interrupted state (309) when the apparatus is idle for a predetermined time period.

Figure 7:
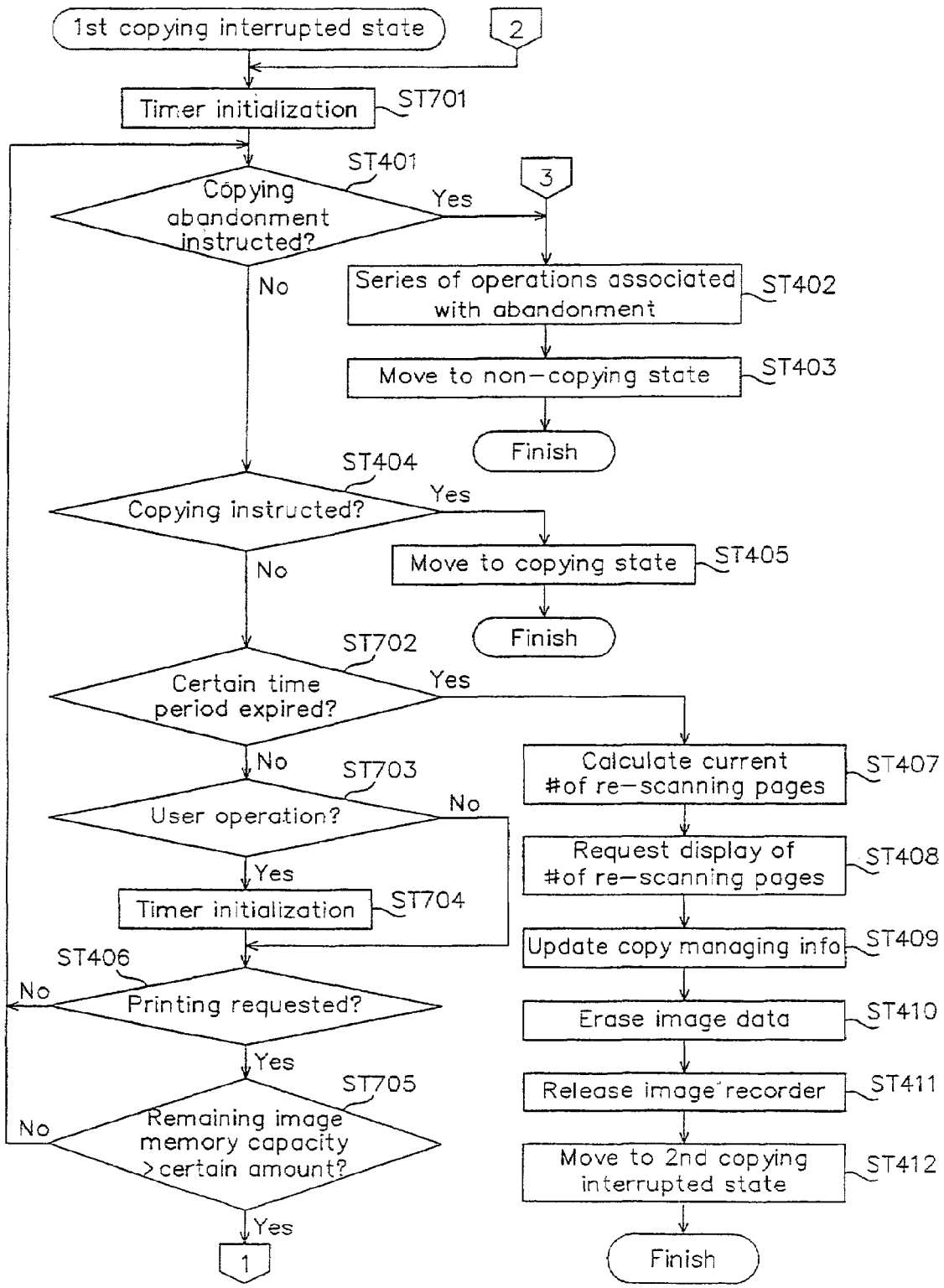
FIG. 7 is a flowchart illustrating an operation when a copying operation is interrupted at the multifunctional printer according to the second embodiment of the present invention.
Figure 8:
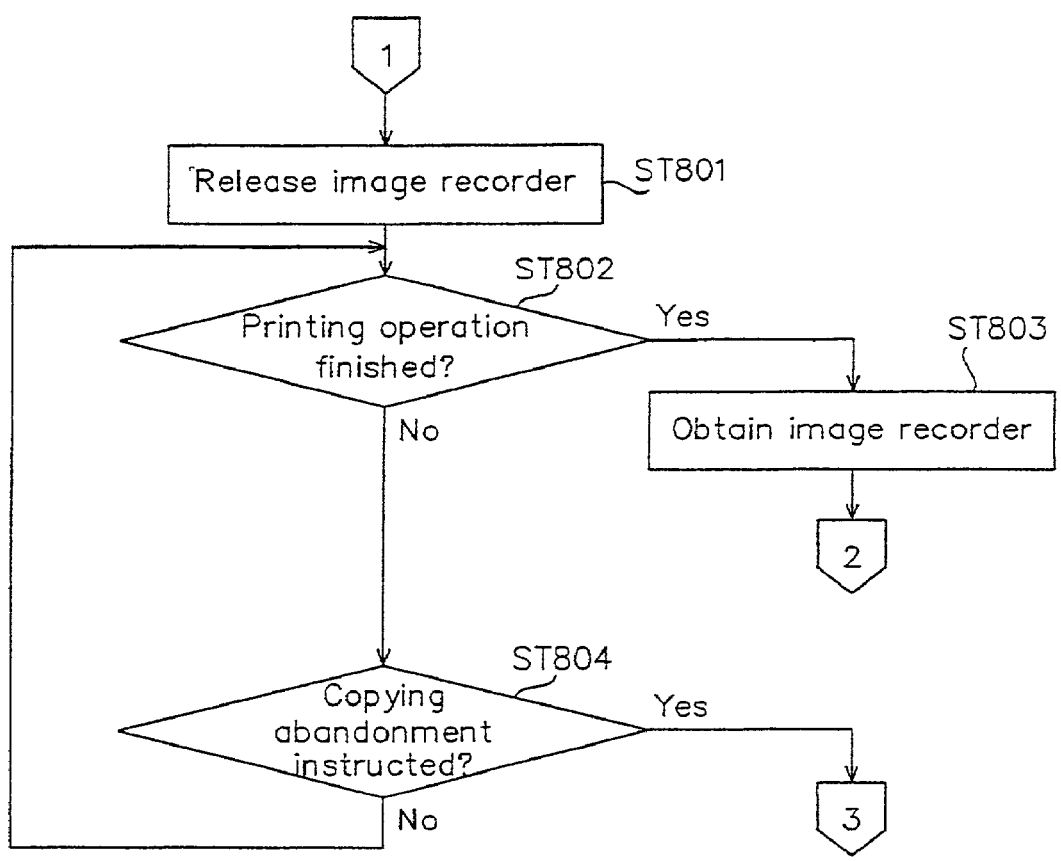
FIG. 8 is a flowchart illustrating an operation when a copying operation is interrupted at the multifunctional printer according to the second embodiment of the present invention.

FIGS. 7 and 8 are flowcharts illustrating an operation when a copying operation is interrupted at multifunctional printer 200 according to the second embodiment (first copying interrupted state). In this embodiment, the first copying interrupted state as the initial state of FIG. 7 is created with the same conditions as of FIG. 4. In FIG. 7, parts with the same numerical characters as in FIG. 4 illustrate the same operations.

Multifunctional printer 200 of the second embodiment initializes a timer that monitors whether the apparatus is idle for a predetermined time period, in the first copying interrupted state (306).

Similar to multifunctional printer 100 of the first embodiment, multifunctional printer 200 then monitors whether there is an instruction to abandon the copying operation by the user (312) (ST 401). If there is an instruction to abandon the copying operation, a series of operations associated with the copying operation abandonment are performed (ST 402), and the control moves to non-copying state (301) (ST 403).

Conversely, if there is no instruction to abandon the copying operation, whether there is another instruction for the copying operation (307) is checked (ST 404). If there is another instruction (307), the control moves to copying state (303) (ST 405).

If there is no instruction for the copying operation (307), whether the predetermined time period set by a timer has expired is checked (ST 702).

If the predetermined time period set by the timer has expired, the re-scanning page number for which the currently retained image data is erased is calculated (ST 407), operation panel 104 is requested to display the re-scanning page number (ST 408), and copy managing information is updated by writing the calculated re-scanning page number in the re-scanning page number information of the copy managing information (ST 409).

When the copy managing information is updated, image data retained in image memory 117 is erased to release image memory 117 to the printing operation (ST 410). Then, image recorder 106 is released to the printing operation (ST 411), and the control moves to the second copying interrupted state (309) (ST 412).

If the predetermined time period set by the timer has not expired, whether the user has performed an operation on multifunctional printer 200 is checked (ST 703). If an operation is performed on multifunctional printer 200, the timer's count is initialized (ST 704), and whether a printing operation is requested by a user (308) is checked (ST 406). The reason for initializing the timer's count is explained below.

In particular, if the image data of image memory 117 were automatically erased upon an expiration of the predetermined time period, the image in image memory 117 would be erased just because the predetermined time period is expired, even though the user had started performing a series of operations, i.e., opening the paper tray, loading recording paper in the paper tray, setting the paper tray, and pressing the start button, etc., right before the expiration. Therefore, the user would have to re-scan the entire document, thereby increasing the workload of the user.

Due to the above reason, by resetting the predetermined time period when a user is performing some operation related to eliminating the reason for the entry into the first copying interrupted state on the apparatus, multifunctional printer 200 of the second embodiment avoids the situation in which the user starts a series of above-described operations before the expiration of a predetermined time period and finishes such operations after the expiration, and the image data of image memory 117 has been already erased. Therefore, it is possible to resume recording of the image data from the point where the copying operation is interrupted, thereby reducing the process of re-scanning the document as much as possible, and decreasing the workload of the user.

If there is no instruction from the user at ST 703, whether there is a direct request for a printing operation from a user is checked (ST 406). If there is no request for the printing operation, the control returns to ST 401, and monitors whether there is an instruction to abandon the copying operation (312).

If a printing operation is requested, whether the remaining capacity of image memory 117 is greater than a predetermined amount is checked (ST 705). If the remaining capacity of image memory 117 is smaller than the predetermined amount, the control returns to ST 401 to monitor whether there is an instruction to abandon the copying operation (312).

If the remaining capacity of image memory 117 is greater than the predetermined amount, image recorder 106 is released to the printing operation as shown in FIG. 8 (ST 801). Then, the control monitors the completion of the printing operation (ST 802).

Likewise, before the predetermined time period expires after paper has run out during a copying operation, and when the remaining capacity of image memory 117 is less than the capacity to be able to receive other operational request, the apparatus will not receive the printing operation request as a separate request. Accordingly, even if there is a request for a printing operation during the predetermined time period, image memory 117 continues to be prioritized for the copying operation when only a short period has passed after paper runs out. Therefore, it is possible to prevent a situation in which the workload to re-scan the document is created only after a short time span since paper has run out.

Conversely, if there is enough remaining capacity of image memory 117 to receive an other operational request, the printing operation request as a separate operation can be received. Accordingly, it is possible to use image memory 117 for the printing operation without erasing the content of image memory 117, thereby preventing creation of additional workload for the user to re-scan the document, and effectively processing a plurality of operations with a limited memory resource.

When the printing operation is completed while monitoring the printing operation, image recorder 106 is again made available for the copying operation (ST 803), and the control returns to ST 701 to initialize the timer and to process the above-described operations.

When the printing operation is still continuing, whether there is an instruction to abandon the copying operation by the user (312) is checked (ST 804). If there is an instruction to abandon the copying operation, the control moves to ST 402 to perform a series of operations associated with the copying operation abandonment and moves to non-copying state (301) (ST 403). If there is no instruction to abandon the copying operation, the control returns to ST 802 to continue monitoring the completion of the printing operation.

In the multifunctional printer 200 of the second embodiment, the selecting operation of the message on operation panel 104 during the first copying interrupted state (306) is the same as in FIG. 5. That is, when the copying operation can be resumed (ST 501) and there is a request for displaying the re-scanning page number (ST 503), operation panel 104 displays the re-scanning page number.

As described above, according to the multifunctional printer 200 of the second embodiment, when a predetermined time period expires after recording paper runs out during the copying operation, image data in image memory 117 is erased in order to release image memory 117 to other operational requests, and re-scanning page number information is retained as managing information illustrating the information of the document necessary for re-scanning. When recording paper is loaded, the user of the multifunctional printer is enabled to re-scan the necessary document according to the re-scanning page number information. Accordingly, when a predetermined time period expires after recording paper runs out during the copying operation, the memory can be used for the other operation. Also, the user is only required to re-scan the document from the point where the copying operation is interrupted, in order to securely scan the entire document that needs to be copied. Therefore, even in case of paper having run out during a copying operation and another operation is requested, it is possible to reduce the user's workload of re-scanning the document, and to efficiently process a plurality of operations with a limited memory resource.

Also, according to the multifunctional printer 200, when paper runs out during a copying operation, image data in image memory 117 is retained for a predetermined time period, so that when recording paper is loaded before the period expires, it is possible to resume the copying operation based on the retained image in image memory 117. Therefore, in case of paper having run out and only a short time having passed, it is possible to prevent the process of re-scanning the document, and to efficiently handle a plurality of operations with a limited memory resource.

Third Embodiment

Multifunctional printer 300 according to the third embodiment of the present invention includes the same configuration as multifunctional printers 100 and 200 of the first and second embodiments, however, a part of the operational control is different. Hereafter, the operation of the multifunctional printer 300 according to the third embodiment is illustrated.

Figure 9:
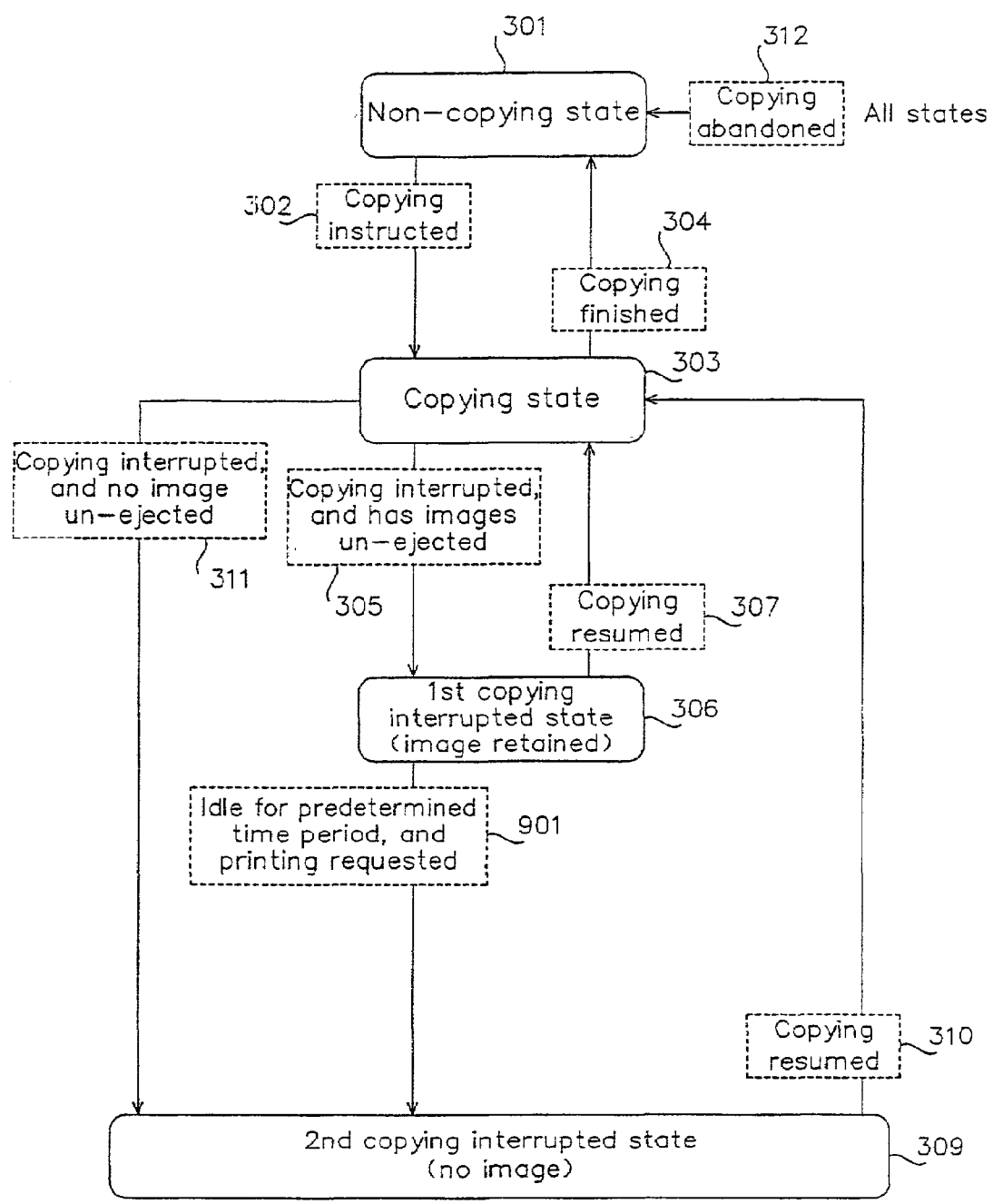
FIG. 9 is a transitional diagram illustrating the control of the multifunctional printer according to a third embodiment of the present invention.

FIG. 9 is a transitional diagram illustrating the control of multifunctional printer 300 according to a third embodiment. In FIG. 9, parts having the same numerical characters as FIGS. 3 and 6 illustrate the same states and transitions as FIGS. 3 and 6.

The state transition of multifunctional printer 300 of the third embodiment in FIG. 9, is different from multifunctional printers 100 and 200 of the first and second embodiments only in transitional conditions of moving from the first copying interrupted state (306) to the second copying interrupted state (309).

Multifunctional printer 200 of the second embodiment moves from the first copying interrupted state (303) to the second copying interrupted state (309) when the apparatus is idle for a predetermined time period, whereas multifunctional printer 300 of the third embodiment moves from the first copying interrupted state (303) to the second copying interrupted state (309) when the apparatus is idle for a predetermined time period and a printing operation is requested.

Figure 10:
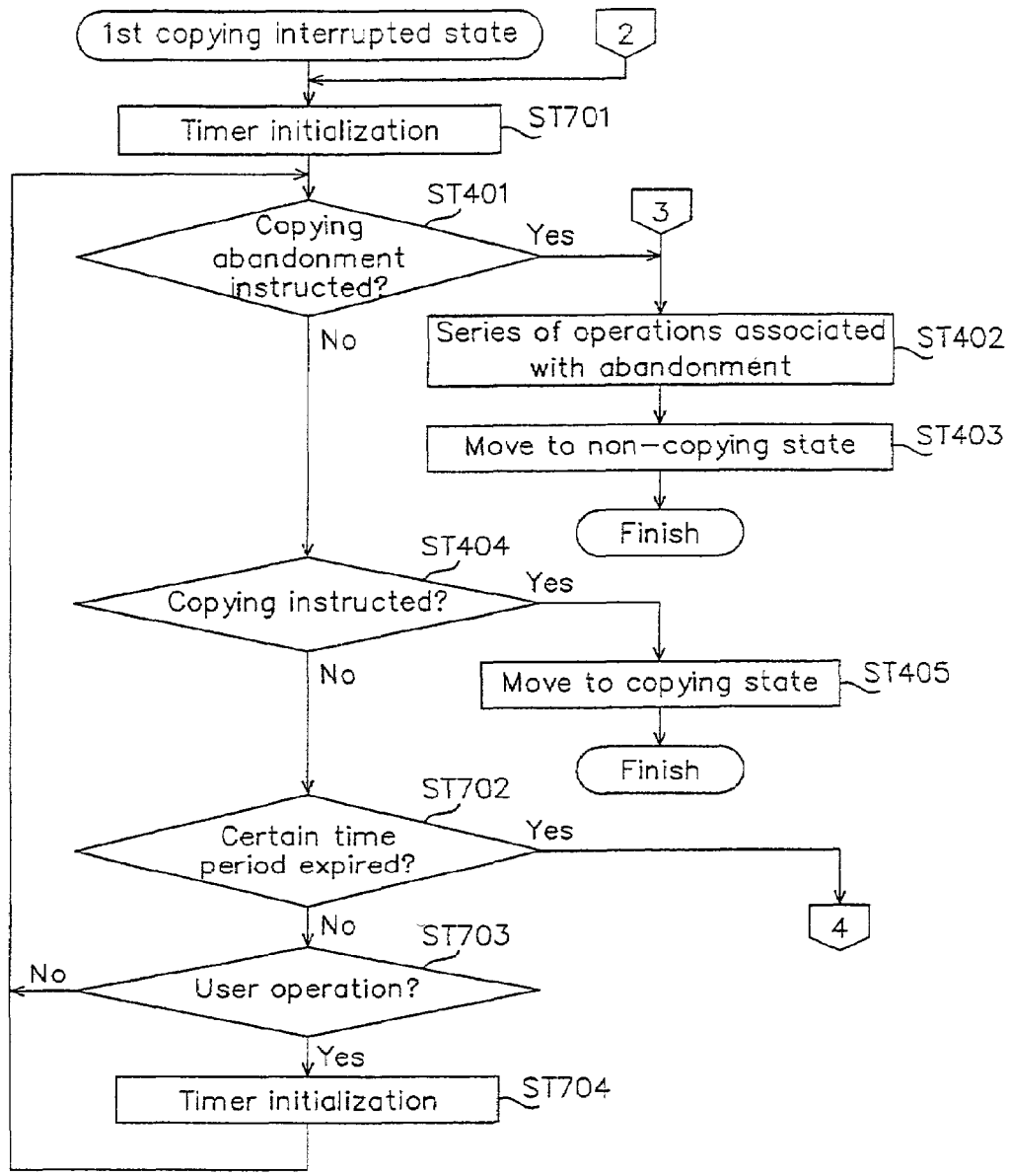
FIG. 10 is a flowchart illustrating an operation when a copying operation is interrupted at the multifunctional printer according to the third embodiment of the present invention.
Figure 11:
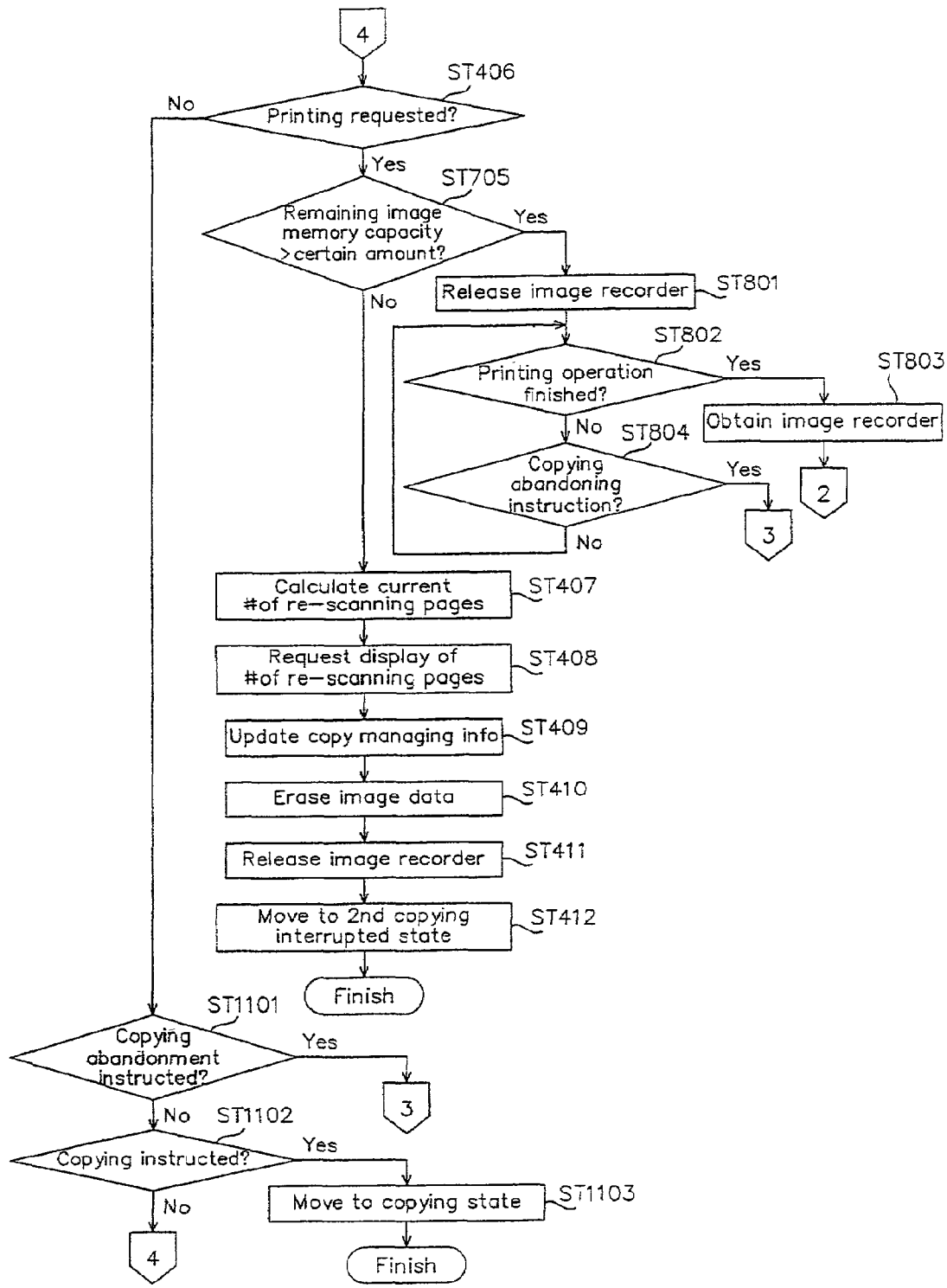
FIG. 11 is a flowchart illustrating an operation when a copying operation is interrupted at the multifunctional printer according to the third embodiment of the present invention.

FIGS. 10 and 11 are flowcharts illustrating an operation when a copying operation is interrupted at multifunctional printer 300 according to the third embodiment (first copying interrupted state). In this embodiment, the first copying interrupted state as the initial state of FIG. 10 occurs in response to the same conditions as of FIGS. 4 and 7. In FIGS. 10 and 11, parts with the same numerical characters as in FIGS. 4, 7, and 8 illustrate the same operations.

Similar to multifunctional printer 200 of the second embodiment, multifunctional printer 300 of the third embodiment initializes a timer that monitors whether the apparatus is idle for a predetermined time period, in the first copying interrupted state (303) (ST 701).

Multifunctional printer 300 then monitors whether there is an instruction to abandon the copying operation by the user (312) (ST 401). If there is an instruction to abandon the copying operation, a series of operations associated with the copying operation abandonment are performed (ST 402), and the control moves to non-copying state (301) (ST 403).

Conversely, if there is no instruction to abandon the copying operation, whether there is another instruction for copying operation (307) is checked (ST 404). If there is another instruction (307), the control moves to copying state (303) (ST 405). If there is no instruction for the copying operation (307), whether the predetermined time period set by a timer has expired is checked (ST 702).

If the predetermined time period set by the timer has not expired, whether the user has performed an operation on multifunctional printer 300 is checked (ST 703). If an operation is performed on multifunctional printer 300, the timer's count is initialized (ST 704) and the control returns to ST 401 and monitors again whether there is an instruction to abandon the copying operation (312).

If there is no instruction from the user at ST 703, the control returns to ST 401, and monitors whether there is an instruction to abandon the copying operation (312), without initializing the timer.

When the predetermined time period set by the timer has expired, whether a printing operation is requested by the user is checked as shown in FIG. 11 (ST 406). If a printing operation is requested, whether the remaining capacity of image memory 117 is greater than a predetermined amount (ST 705) is checked.

If the remaining capacity of image memory 117 is smaller than the predetermined amount, the re-scanning page number is calculated for when the currently retained image data is erased (ST 407), operation panel 104 is requested to display the re-scanning page number (ST 408), and copy managing information is updated by writing the calculated re-scanning page number in the re-scanning page number information of the copy managing information (ST 409).

When the copy managing information is updated, image data retained in image memory 117 is erased to release image memory 117 to the printing operation (ST 410). Then, image recorder 106 is released to the printing operation (ST 411), and the control moves to the second copying interrupted state (309) (ST 412).

If the remaining capacity of image memory 117 is greater than the predetermined amount, image recorder 106 is released to the printing operation (ST 801). Then, the control monitors the completion of the printing operation (ST 802).

Thus, when a printing operation is requested as a separate operation after expiration of a predetermined time period since paper has run out during a copying operation, if there is enough remaining capacity of image memory 117 to receive another operational request, the printing operation request can be received without erasing the image data of image memory 117. Accordingly, even if a printing operation is requested before recording paper is loaded in case of paper having run out during a copying operation, it is possible to use image memory 117 for the printing operation request without erasing the content of image memory 117, thereby preventing creation of another workload for the user to re-scan the document, and effectively processing plurality of operations with a limited memory resource.

When the printing operation is completed while monitoring the printing operation, image recorder 106 is obtained again for the copying operation (ST 803), and the control returns to ST 701 to initialize the timer and to process the above-described operations.

When the printing operation is still continuing, whether there is an instruction to abandon the copying operation by the user (312) is checked (ST 804). If there is an instruction to abandon the copying operation, the control moves to ST 402 to perform a series of operations associated with the copying operation abandonment and moves to non-copying state (301) (ST 403). If there is no instruction to abandon the copying operation, the control returns to ST 802 to continue monitoring the completion of the printing operation.

If a printing operation is not requested at ST 406, whether there is an instruction to abandon the copying operation (312) is checked (ST 1101). If there is an instruction to abandon the copying operation, the control moves to ST 402, to perform a series of operations associated with the copying operation abandonment (ST 402), and moves to non-copying state (301) (ST 403).

If there is no instruction to abandon the copying operation, whether there is another instruction for the copying operation by the user (307) is checked (ST 1102). If there is another instruction (307), the control moves to copying state (303) (ST 1103). If there is no instruction for the copying operation (307), the control returns to ST 406 to monitor again whether a printing operation is requested.

In the multifunctional printer 300 of the third embodiment, the selecting operation of the message on operation panel 104 during the first copying interrupted state (306) is the same as in FIG. 5. That is, when the copying operation can be resumed (ST 501) and there is a request for displaying the re-scanning page number (ST 503), operation panel 104 displays the re-scanning page number.

As described above, according to the multifunctional printer 300 of the third embodiment, when a predetermined time period expires and a printing operation is requested as a separate operation after recording paper has run out during the copying operation, image data in image memory 117 is erased in order to release image memory 117 to other operational requests, and re-scanning page number information is retained as managing information illustrating the information of the document necessary for re-scanning. When recording paper is loaded, the user of the multifunctional printer 300 is enabled to re-scans the necessary document according to the re-scanning page number information. Accordingly, when a predetermined time period expires and a separate operation is requested after recording paper has run out during the copying operation, the memory can be used for the other operation. Also, the user is only required to re-scan the document from the point where the copying operation is interrupted, in order to securely scan the entire document that needs to be copied. Therefore, even in case of paper having run out during a copying operation and another operation being requested, it is possible to reduce the user's workload of re-scanning the document, and to efficiently process plurality of operations with a limited memory resource.

Also, according to the multifunctional printer 300, even after a predetermined time period expires since a copying operation is interrupted, image data in image memory 117 is retained until a printing operation is requested as a separate operation. Thus, when recording paper is loaded, it is possible to resume the copying operation based on the retained image in image memory 117. Therefore, in case of paper having run out and another operation being requested, it is possible to reduce the user's workload of re-scanning the document as much as possible, and to efficiently process a plurality of operations with a limited memory resource.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and sprit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of appended claims.

This application is based on the Japanese Patent Application No. 2001-112748 filed on Apr, 11, 2001, entire content of which is expressly incorporated by reference herein.

What is claimed is:

1. A multifunctional printer that can perform a copying operation and at least one other operation, the printer comprising:
   a memory that stores an image of a scanned document and document managing information;
   an image recorder that performs a copying operation based on the image stored in said memory; and
   a controller that erases the image stored in said memory when the at least one other operation is requested and when recording paper has run out during a copying operation of said image recorder, releases said memory for the at least one other operation, retains the document managing information necessary for re-scanning the document, and enables re-scanning of the document according to the document managing information when recording paper is loaded.

2. The multifunctional printer of claim 1, wherein said controller enables said image recorder to resume the copying operation from a point where the copying operation was interrupted, if recording paper is loaded before the other operation is requested, while retaining the image of said memory until the other operation is requested.

3. The multifunctional printer of claim 1, wherein the other operation is printing an image from an external device.

4. A multifunctional printer that can perform a copying operation and at least one other operation, the printer comprising:
   a memory that stores an image of a scanned document and document managing information;
   an image recorder that performs a copying operation based on the image stored in said memory; and
   a controller that erases the image stored in said memory when a predetermined time period expires and when recording paper has run out during the copying operation of said image recorder, releases said memory for the at least one other operation, retains the document managing information necessary for re-scanning the document, and enables re-scanning of the document according to the document managing information when recording paper is loaded.

5. The multifunctional printer of claim 4, wherein said controller enables said image recorder to resume the copying operation from a point where the copying operation was interrupted, if recording paper is loaded before the predetermined time period expires, while retaining the image of said memory until the predetermined time period expires.

6. The multifunctional printer of claim 4, wherein the other operational request is not accepted if the request is made before the predetermined time period expires and a remaining capacity of said memory is smaller than a predetermined amount.

7. The multifunctional printer of claim 4, wherein the other operational request is accepted if the request is made before the predetermined time period expires and a remaining capacity of said memory is larger than a predetermined amount.

8. A multifunctional printer that can perform a copying operation and at least one other operation, the printer comprising:
   a memory that stores an image of a scanned document and document managing information;
   an image recorder that performs a copying operation based on the image stored in said memory; and
   a controller that erases the image stored in said memory when a predetermined time period expires and the at least one other operation is requested and when recording paper has run out during a copying operation of said image recorder, releases said memory for the at least one other operation, retains document managing information necessary for re-scanning, and enables re-scanning of the document according to the document managing information when recording paper is loaded.

9. The multifunctional printer of claim 8, wherein said controller enables said image recorder to resume the copying operation from a point where the copying operation was interrupted even after the predetermined time period has expired, if recording paper is loaded before the other operation is requested, while retaining the image of said memory until the predetermined time period expires and the other operation is requested.

10. The multifunctional printer of claim 8, wherein the controller receives the other operational request without erasing the image in said memory, if a remaining capacity of said memory is greater than a predetermined amount when the predetermined time period has expired and the other operation is requested.

11. The multifunctional printer of claim 4, wherein the predetermined time period is reset by an operation of a user of the multifunctional printer.

12. A method of performing a copying operation utilizing a multifunction printer that can perform at least one other operation, the method comprising:
   storing, in a memory, an image of a scanned document and document management information;
   performing a copying operation based on the stored image;
   erasing the stored image when the at least one operation is requested and when recording paper has run out, during the copying operation;
   releasing the memory for the at least one other operation;
   retaining the document management information necessary for re-scanning the document in the memory; and
   enabling re-scanning of the document in accordance with the retained document management information when recording paper is loaded.

13. The method according to claim 12 further comprising enabling the resumption of the copying operation from the point where the copying operation was interrupted if the recording paper is loaded before the at least one other operation is requested and retaining the image in the memory until the other operation is requested.

14. A method of performing a copying operation utilizing a multifunction printer that can perform at least one other operation, the method comprising:
   storing, in a memory, an image of a scanned document and document management information;
   performing a copying operation based on the stored image;
   erasing the stored image when a predetermined time period expires and when recording paper has run out, during the copying operation;
   releasing the memory for the at least one other operation;
   retaining the document management information necessary for re-scanning the document in the memory; and
   enabling re-scanning of the document in accordance with the retained document management information when recording paper is loaded.

15. A method of performing a copying operation utilizing a multifunction printer that can perform at least one other operation, the method comprising:
   storing, in a memory, an image of a scanned document and document management information;
   performing a copying operation based on the stored image;
   erasing the stored image when a predetermined time period expires the at least one operation is requested and when recording paper has run out, during the copying operation;
   releasing the memory for the at least one other operation;
   retaining the document management information necessary for re-scanning the document in the memory; and
   enabling re-scanning of the document in accordance with the retained document management information when recording paper is loaded.

* * * * *